Patented Dec. 4, 1928.

1,694,205

UNITED STATES PATENT OFFICE.

RALPH N. CHIPMAN, OF PLAINFIELD, NEW JERSEY.

WEED KILLER AND METHOD OF KILLING WEEDS.

No Drawing. Application filed April 15, 1926. Serial No. 102,312.

This invention relates to a weed killer and method of killing weeds. Its object is to produce a weed killer which, when in use on and within plants, has a much more intense, weed killing quality or property than has heretofore been known and which contains a hygroscopic ingredient that is compatible with the herbicidal agent and which is coactive with constituents of the plants or vegetation to be killed, the hygroscopicity of the herbicide keeping it from drying out on and within plants and prolonging its herbicidal effect.

One substantial, material and crucial factor in my new conception of means to this end is the incorporation in the weed killing liquor of an ingredient which constantly draws moisture from the air, during the period of the activity of the weed killer on and within plants, and of another ingredient which, at the same time effects a constant liberation of nascent oxygen.

I herein below set forth chemicals and the approximate proportions thereof which are severally and combinatively now preferred for forming an aqueous, herbicidal liquor containing this invention; but it is to be understood that the proportions may be varied without departure from the invention and that I intend to cover all chemical equivalents.

Preferably, but not necessarily, for the best results as now known to me for plants of marine origin, I mix together about 3 to 4½ lbs. avoirdupois of calcium chlorate $Ca(ClO_3)_2$.

2 to 3 lbs. avoirdupois of calcium chloride $(CaCl_2)$.

Adding water to make one gallon of solution.

The foregoing ingredients result in about one gallon of liquor of about 29% calcium chlorate and of about 16% calcium chloride, whereby my new weed killer solution has about 45% of active weed killing content, and being free from sodium chloride, is especially useful for regions teeming with marine growths.

Another suitable liquor of the same nature for a more general purpose may be conveniently made by the following formula:

3 to 4½ lbs. avoirdupois of sodium chlorate $(NaClO_3)$ to the 2 to 5 lbs. avoirdupois of calcium chloride $(CaCl_2)$.

Adding water to make one gallon of solution.

This method of making the compounds in suitable combination has the distinct advantage of utilizing relatively inexpensive raw materials and of yielding a combination of compounds ultimately which cooperate to retard secondary growths of plant mixtures, i. e., those not as well as those of marine origin.

In the latter formula, all of the sodium chlorate by chemical combination with all but the excess of the calcium chloride is converted into calcium chlorate in accordance with the following equation:

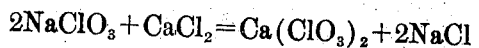
$$2NaClO_3 + CaCl_2 = Ca(ClO_3)_2 + 2NaCl$$

By metathesis, the sodium chemically combines with the chlorine of the calcium chloride and may or may not precipitate out as salt (NaCl) according to the regulation of the water content, as may be preferred. The resultant liquor is a calcium chlorate-calcium chloride liquor which may for special uses be substantially freed of salt (NaCl), as is sometimes desirable, because salt (NaCl) is promotive of the growth of some weeds and plants of marine ancestry.

It is to be noted particularly that, in each of the foregoing liquors, (the one containing no and the other containing some sodium chloride), the calcium chloride is an element constantly acting to draw moisture from the atmosphere and it may be considered as an evaporation retarder compatible with a chlorate of an alkaline earth base; and in its behavior in conjunction with the chlorates, materially adds to the destruction of the equilibrium of the plant processes, as hereinafter described.

In my search and experimentation for a weed killing, aqueous liquor which would be absorbed by and become lethal both on and within a plant and be intensively deadly to chlorophyll (considered as the lungs of a plant) and of other constituents of plant life, the described herbicidal liquors (containing the chemically active, water-drawing element) are the best of various types of slow-drying, aqueous herbicides known to me. They are non-poisonous to animal life, their constantly effective water-drawing content keeps them constantly moist and reduces the hazard of combustion when in contact with organic matter.

It is necessary, or at least desirable, before considering the functions and effects of such a slow-drying weed killer, when it is on and within a plant, briefly to consider the plant structure.

The form and arrangement of the parts of a typical foliage leaf are intimately associated with the part played by the leaf in the life of the plant. The flat surface is spread to allow the maximum amount of sunlight to fall upon it; as it is by the absorption of energy from the sun's rays by (means of the chlorophyll contained in the cells of the leaf) that the building up of the plant food is rendered possible. This process is known as photo-synthesis. The first stage is the combination of carbon-dioxide absorbed from the air, taken in through the stomata into the living cells of the leaf, with water which is brought into the leaf by wood vessels. The wood vessels form part of the fibro-vascular bundles of veins of the leaf and are continuous through the leaf stalk and stem with the root by which water is obsorbed from the soil.

The palisade layers of the mesophyll contain the larger number of chlorophyll grains or corpuscles while the absorption of carbon dioxide is carried on chiefly through the lower epidermis which is generally much richer in stomata.

The water taken up by the roots from the soil contains nitrogenous and mineral salts which combine with the first product of photo-synthesis—a carbohydrate—to form more complicated nitrogen containing food substances of a protein nature. These are then distributed by other elements of the vascular bundles through the leaf to the stem and so throughout the plant to wherever growth or development is going on.

A large proportion of the water which ascends to the leaf acts merely as a carrier for the other raw food materials, and is got rid of from the leaf in the form of water vapor through the stomata. The process is known as transpiration. Hence the extended surface of the leaf exposing a large area to light and air is eminently adapted for the carrying out of the process of photo-synthesis and transpiration.

When the weed killer is applied to plants or vegetation to be killed by spraying or otherwise, the calcium chloride continually draws moisture from the air, so long as the calcium chloride is active as such.

How the actual destructive processes ensue must be largely speculative until the present mysteries in agricultural chemistry become less obscure. It seems possible that the calcium chlorate, due to its chemical affinity for carbon dioxide gas in the air and leaf, and taken therein from the air, in breaking down, liberates nascent oxygen as follows:

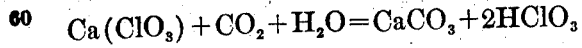

in which atoms of nascent oxygen serve to form, on and within the plant, a new, concentrated, herbicidal field of intense plant killing activity. This field, as I call it, is a minute area; and, as a plant is sprayed or covered with the weed killer, the number of such continuously active, herbicidal fields, which are contiguous and overlapping, are multitudinous. In this way, the vegetation sprayed is coated and very thoroughly saturated with multitudinous herbicidal fields of intense, weed penetrating and weed killing activity. The saturation of the plant is automatic as a result of keeping the weed killing constituents moist. All the time during the active life of the weed killer, in situ, the calcium chloride draws moisture from the air, and so long as the calcium chlorate, in situ, is kept moist, so long is it in condition to be absorbed by and chloritize the plant. Such absorption causes the calcium chlorate, in situ, to decompose with the plant juices and carbon dioxide gas, ever present in air and in plants to form carbonic acid and a certain amount of chloric acid ($HClO_3$) is liberated. This chloric acid has a very corrosive and erosive action on all constituents of living plants.

As above described, the chlorophyll cellular structure is destroyed and at the same time the chemical and physical equilibrium of the plant processes and sap are destroyed. The plant root, being deprived of any further ability to continue its function, cannot further absorb nutriment or moisture from the soil or receive the vitally necessary chemical and physical support from the leaves, so that the entire root structure atrophies and disintegrates.

The calcium chlorate, by its continued contact with the organic material, will ultimately be deprived of all of its oxygen and will finally exist as a residue of calcium chloride. In that phase it forms, in cooperation with such sodium chloride as may concurrently be present, an effective agency for retarding germination of the various plant types. For example, sodium chloride is detrimental to some growths while stimulative to others but the calcium chloride, being a distinct retardant to germination, will in turn negative the stimulative tendency of the sodium chloride towards plants of marine ancestry.

What I claim is:

1. A weed killer decomposable ultimately into lime and constituted fundamentally of calcium as a base, the calcium being combined chemically with chlorine and oxygen-chlorine radicals.

2. A herbicidal preparation composed essentially of an element the carbonate of which is relatively insoluble; said element being combined with oxygen and chlorine to form a water-soluble compound adapted in the presence of $CO_2$ gas and plant tissue gradually to liberate oxygen, chlorine and combinations thereof and to form insoluble carbonates.

3. A non-poisonous herbicide comprised essentially of calcium chlorate.

4. A complex weed killer decomposable ultimately into lime and constituted fundamentally of calcium as a base, the calcium being combined chemically with chlorine and oxygen-chlorine radicals, and associated with a deliquescent salt.

5. An herbicidal preparation composed essentially of an element the carbonate of which is relatively insoluble; said element being combined with both oxygen and chlorine, and being combined with chlorine alone, to form two associated water-soluble compounds adapted in the presence of $CO_2$ gas and plant tissue gradually to liberate oxygen, chlorine and combinations thereof and to form insoluble carbonates.

6. A non-poisonous herbicide comprised essentially of both calcium chlorate and calcium chloride.

7. The art of wilting grown weeds of mixed origins and of retarding secondary germinations thereof which consists in spraying the leaves thereof with an aqueous solution composed of the chlorate of an alkaline earth base and common salt whereby the chlorate may decompose by destructive contact with the organic tissue to produce a highly hygroscopic chloride of said base and thereafter cooperate with said common salt to retard secondary growths.

8. The art of wilting grown weeds and of retarding secondary germinations thereof which consists in spraying the leaves thereof with an aqueous solution of the oxidizing chlorate of an alkaline earth base and the liquescent chloride of an alkaline earth base.

9. The art of wilting grown weeds and of retarding secondary germinations thereof consists in spraying the leaves thereof with an aqueous solution composed of sodium chloride, and the chloride and chlorate of an alkaline earth base.

10. A non-poisonous non-explosive liquid for wilting grown weeds of mixed origins and for inhibiting secondary germinations thereof, said liquid being an aqueous solution of the chlorate and the chloride of an alkaline earth base; each in a considerable quantity.

Signed at New York city in the county of New York and State of New York this 24th day of March, A. D. 1926.

RALPH N. CHIPMAN.